(12) United States Patent
Laroche et al.

(10) Patent No.: US 11,095,878 B2
(45) Date of Patent: Aug. 17, 2021

(54) METHOD AND DEVICE FOR ENCODING A SEQUENCE OF IMAGES AND METHOD AND DEVICE FOR DECODING A SEQUENCE OF IMAGE

(71) Applicant: CANON KABUSHIKI KAISHA, Tokyo (JP)

(72) Inventors: Guillaume Laroche, Rennes (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/422,865

(22) Filed: May 24, 2019

(65) Prior Publication Data

US 2019/0281287 A1    Sep. 12, 2019

Related U.S. Application Data

(63) Continuation of application No. 14/123,941, filed as application No. PCT/EP2012/060601 on Jun. 5, 2012, now abandoned.

(30) Foreign Application Priority Data

Jun. 6, 2011    (GB) ..................................... 1109450

(51) Int. Cl.
*H04N 19/503* (2014.01)
*H04N 19/105* (2014.01)
(Continued)

(52) U.S. Cl.
CPC ......... *H04N 19/105* (2014.11); *H04N 19/174* (2014.11); *H04N 19/176* (2014.11);
(Continued)

(58) Field of Classification Search
CPC ..... H04N 19/105; H04N 19/176; H04N 19/52
See application file for complete search history.

(56) References Cited

U.S. PATENT DOCUMENTS

| 5,552,831 A | 9/1996 | Machida |
|---|---|---|
| 6,552,673 B2 | 4/2003 | Webb |

(Continued)

FOREIGN PATENT DOCUMENTS

| CN | 1256049 A | 6/2000 |
|---|---|---|
| CN | 1440203 A | 9/2003 |

(Continued)

OTHER PUBLICATIONS

J Jung et al; Joint Collaborative Team on Video Coding (JCT-VC) of ITU-T SG16 WP3 and ISO/IEC JTC1/SC29/WG11, 4th Meeting, JCTVC-D197.

*Primary Examiner* — Zhubing Ren
(74) *Attorney, Agent, or Firm* — Canon U.S.A., Inc. IP Division

(57) ABSTRACT

A method and device for deriving motion information of an image portion of an image predicted by motion prediction with respect to at least one reference image, the method comprising for said image portion: obtaining a number i of motion information predictors 808 of a second set of motion information predictors 814 taken from a first set of motion information predictors for decoding the image portion; generating said second set of motion information predictors 814 consisting of said number i of motion information predictors, wherein there are no duplicates among the i motion information predictors of said second set. A method and device for of decoding a bitstream, and a method and device for encoding a sequence of image including a method for deriving motion information of an image portion of an image predicted by motion prediction with respect to at least one reference image as described above.

15 Claims, 12 Drawing Sheets

(51) Int. Cl.
*H04N 19/65* (2014.01)
*H04N 19/51* (2014.01)
*H04N 19/70* (2014.01)
*H04N 19/174* (2014.01)
*H04N 19/52* (2014.01)
*H04N 19/513* (2014.01)
*H04N 19/89* (2014.01)
*H04N 19/176* (2014.01)
*H04N 19/44* (2014.01)

(52) U.S. Cl.
CPC ........... *H04N 19/44* (2014.11); *H04N 19/503* (2014.11); *H04N 19/51* (2014.11); *H04N 19/513* (2014.11); *H04N 19/52* (2014.11); *H04N 19/65* (2014.11); *H04N 19/70* (2014.11); *H04N 19/89* (2014.11)

(56) References Cited

U.S. PATENT DOCUMENTS

| | | | |
|---|---|---|---|
| 7,620,106 B2 | 11/2009 | Holcomb | |
| 7,630,442 B2 | 12/2009 | Sekiguchi | |
| 2005/0053134 A1 | 3/2005 | Holcomb | |
| 2005/0207663 A1 | 9/2005 | Zeng | |
| 2007/0047649 A1 | 3/2007 | Suzuki | |
| 2007/0081588 A1 | 4/2007 | Raveendran | |
| 2007/0248331 A1 | 10/2007 | Hamada | |
| 2008/0002770 A1 | 1/2008 | Ugur | |
| 2008/0247461 A1 | 10/2008 | Nishida | |
| 2009/0268821 A1 | 10/2009 | Au | |
| 2009/0304084 A1* | 12/2009 | Hallapuro | H04N 19/52 375/240.16 |
| 2010/0020877 A1 | 1/2010 | Au | |
| 2010/0020881 A1 | 1/2010 | Kotaka | |
| 2010/0182499 A1 | 7/2010 | Setton | |
| 2011/0080954 A1 | 4/2011 | Bossen | |
| 2011/0194608 A1* | 8/2011 | Rusert | H04N 19/105 375/240.16 |
| 2011/0317930 A1 | 12/2011 | Kim | |
| 2012/0307903 A1* | 12/2012 | Sugio | H04N 19/105 375/240.16 |

FOREIGN PATENT DOCUMENTS

| | | |
|---|---|---|
| CN | 1450809 A | 10/2003 |
| CN | 1525762 A | 9/2004 |
| CN | 1575590 A | 2/2005 |
| CN | 1599461 A | 3/2005 |
| CN | 1622635 A | 6/2005 |
| CN | 1893665 A | 1/2007 |
| CN | 101005620 A | 7/2007 |
| CN | 101064849 A | 10/2007 |
| CN | 101120594 A | 2/2008 |
| CN | 101123728 A | 2/2008 |
| CN | 101123731 A | 2/2008 |
| CN | 101155311 A | 4/2008 |
| CN | 101247522 A | 8/2008 |
| CN | 101267567 A | 9/2008 |
| CN | 101305616 A | 11/2008 |
| CN | 101350927 A | 1/2009 |
| CN | 101375602 A | 2/2009 |
| CN | 101466036 A | 6/2009 |
| CN | 101584215 A | 11/2009 |
| CN | 101631247 A | 1/2010 |
| CN | 101777963 A | 7/2010 |
| CN | 101822061 A | 9/2010 |
| CN | 101860754 A | 10/2010 |
| CN | 101931803 A | 12/2010 |
| JP | 2007-228371 A | 9/2007 |
| WO | 2010/041624 A1 | 4/2010 |

* cited by examiner

METHOD AND DEVICE FOR ENCODING A SEQUENCE OF IMAGES AND METHOD AND DEVICE FOR DECODING A SEQUENCE OF IMAGE

CROSS-REFERENCE TO RELATED APPLICATIONS

This application is a continuation of U.S. patent application Ser. No. 14/123,941 filed Dec. 4, 2013 which is a National Stage Entry of PCT/EP2012/060601 filed Jun. 5, 2012 and which claims priority from Great Britain Patent Application No. 1109450.5 filed Jun. 6, 2011 all of which are hereby incorporated by reference herein in their entirety.

FIELD OF THE INVENTION

The present invention concerns a method and device for encoding a sequence of digital images and a method and device for decoding a corresponding bitstream. The invention further relates to a method and device for deriving motion information of an image portion of an image predicted by motion prediction with respect to at least one reference image The invention belongs to the field of digital signal processing, and in particular to the field of video compression using motion compensation to reduce spatial and temporal redundancies in video streams.

BACKGROUND OF INVENTION

Many video compression formats, such as for example H.263, H.264, MPEG-1, MPEG-2, MPEG-4, SVC, use block-based discrete cosine transform (DCT) and motion compensation to remove spatial and temporal redundancies. They can be referred to as predictive video formats. Each frame or image of the video signal is divided into slices which are encoded and can be decoded independently. A slice is typically a rectangular portion of the frame, or more generally, a portion of a frame or an entire frame. Further, each slice is divided into macroblocks (MBs), and each macroblock is further divided into blocks, typically blocks of 8×8 pixels. The encoded frames are of two types: temporal predicted frames (either predicted from one reference frame called P-frames or predicted from two reference frames called B-frames) and non temporal predicted frames (called Intra frames or I-frames).

Temporal prediction consists in finding in a reference frame, either a previous or a future frame of the video sequence, an image portion or reference area which is the closest to the block to encode. This step is known as motion estimation. Next, the block is predicted using the reference area (motion compensation)—the difference between the block to encode and the reference portion is encoded, along with an item of motion information relative to the motion vector which indicates the reference area to use for motion compensation.

In order to further reduce the cost of encoding motion information, it has been proposed to encode a motion vector in terms of a difference between the motion vector and a motion vector predictor, typically computed from the motion vectors of the blocks surrounding the block to encode.

In H.264, motion vectors are encoded with respect to a median predictor computed from the motion vectors situated in a causal neighbourhood of the block to encode, for example from the blocks situated above and to the left of the block to encode. Only the difference, also called residual motion vector, between the median predictor and the current block motion vector is encoded.

Encoding using residual motion vectors saves some bitrate, but necessitates that the decoder performs the same computation of the motion vector predictor in order to decode the value of the motion vector of a block to decode.

Recently, further improvements have been proposed, such as using a plurality of possible motion vector predictors. This method, often referred to as motion vector competition (MVCOMP), consists in determining from among several motion vector predictors or candidates which motion vector predictor minimizes the encoding cost, typically a rate-distortion cost, of the residual motion information. The residual motion information comprises the residual motion vector, i.e. the difference between the actual motion vector of the block to encode and the selected motion vector predictor, and an item of information indicating the selected motion vector predictor, such as for example an encoded value of the index of the selected motion vector predictor.

In High Efficiency Video Coding (HEVC), it has been proposed to use a plurality of motion vector predictors as schematically illustrated in the example of FIG. 1: Three so-called spatial motion vector predictors $V_1$, $V_2$ and $V_3$ taken from blocks situated in the neighbourhood of the block to encode; a median motion vector predictor computed based on the components of the three spatial motion vector predictors $V_1$, $V_2$ and $V_3$ and a temporal motion vector predictor $V_0$ which is the motion vector of the co-located block in a previously encoded image of the sequence (e. g. block of image N−1 located at the same spatial position as block 'Being coded' of image N). Currently in HEVC the 3 spatial motion vector predictors are taken from the block situated to the left of the block to encode ($V_3$), the block situated above ($V_2$) and from one of the blocks situated at the respective corners of the block to encode, according to a predetermined rule of availability. This motion vector predictor selection scheme is called Advanced Motion Vector Prediction (AMVP) which allows the selection of the best predictor from a given set. In the example of FIG. 1, the vector $V_1$ of the block situated above left is selected.

Finally, a set of 5 motion vector predictor candidates mixing spatial predictors and temporal predictors is obtained. In order to reduce the overhead of signaling the motion vector predictor in the bitstream, the set of motion vector predictors is reduced by eliminating the duplicate motion vectors, i.e. the motion vectors which have the same value. For example, in the illustration of FIG. 1, $V_1$ and $V_2$ are equal, and $V_0$ and $V_3$ are also equal, so only two of them should be kept as motion vector prediction candidates, for example $V_0$ and $V_1$. In this case, only one bit is necessary to indicate the index of the motion vector predictor to the decoder.

A further reduction of the set of motion vector predictors, based on the values of the predictors, is possible. Once the best motion vector predictor is selected and the motion vector residual is computed, it is possible to further eliminate from the prediction set the candidates which would have not been selected, knowing the motion vector residual and the cost optimization criterion of the encoder. A sufficient reduction of the set of predictors leads to a gain in the signaling overhead, since the indication of the selected motion vector predictor can be encoded using fewer bits. The set of candidates may even be reduced to 1, for example if all motion vector predictors are equal. In such a case it is not necessary to insert any information relative to the selected motion vector predictor in the bitstream since the decoder can infer the motion vector predictor value.

In AMVP the optimal amount of spatial and temporal predictors can be evaluated. A current implementation includes 2 spatial predictors and one temporal collocated predictor, for example.

To summarize, the encoding of motion vectors by difference with a motion vector predictor, along with the reduction of the number of motion vector predictor candidates leads to a compression gain.

One known problem of video streams is their relative fragility to transmission errors. The main issue is related to error propagation. Indeed, due to prediction, one error in a bitstream portion may propagate to other received portions. However, in previous standards such as H.264, the bitstream was constructed so that even with errors, the bitstream can still be read by the decoder allowing it to resynchronize the decoding after a reasonable time.

One issue associated with AMVP, is the heavy risk of bitstream de-synchronization in case of losses. The problem occurs when one motion vector predictor is lost. In that case, the decoder cannot apply the suppression algorithm in the same context as the encoder. Indeed, if one motion vector is missing, it is impossible to determine if this missing motion vector predictor was equal to at least one of the other motion vector predictors or not. As a consequence, since the number of bits allocated to the index of motion vector predictor signaling depends on the amount of motion vector predictors remaining after the suppression algorithm, the decoder is no longer capable of determining how many bits have to be read for the index. This causes a de-synchronization of the decoder that may prevent the complete bitstream from being decoded until the next re-synchronization frame (IDR frame in H.264/AVC). Up to this frame, visually, the sequence is frozen.

One approach sets out to address this problem by a determination of the number of predictors according to the data which comes from the current slice. Consequently, the number of predictors does not depend on the value of the motion vector. This provides to the parsing a robustness to transmission errors. To improve the coding efficiency, a duplicate candidate in a predictor set which is a duplicate of any another candidate in the predictor set is removed and replaced by non-duplicate candidate. This offers an optimal use of the number of bits dedicated to the predictor index. Another advantage is that the parsing complexity is reduced compared to HEVC because the motion vector field does not need to be built for parsing application.

FIG. 2 illustrates the flow chart of a predictor index coding method using such an approach. In step 601 the number of predictors in a predictor set is determined and according to the data from the current slice rather than from the motion vector value which could depend on other slices. In step 602 the number of predictors is provided. In step 604 the predictor index 603 of the best predictor selected based on rate distortion (RD) criterion is converted to a code word 605 and this code word 605 is then entropy coded in step 606.

FIG. 3 shows the flow chart of the AMVP scheme applying the above approach at the decoder side. In step 703 the number of predictors 704 is determined and provided. The number of predictors 704 is then used in step 705 for the entropy decoding of the predictor index code word 706 retrieved from the bitstream 702. In step 707 the code word obtained in step 706 is converted to an index defining the motion vector predictor index 708. This process is sufficient for index decoding or the predictor index parsing. For decoding of the motion information, a first list of predictors 710 is derived in step 709 according to the motion vectors field and the reference frame index obtained in step 701. A suppression process is then applied 711 to produce a reduced motion vector predictors set 712. Next, in step 713 a set of non duplicate predictors is generated, each candidate predictor is compared to all predictors in the list to determine if it is a duplicate of another predictor according to the number of predictors in the final predictor set provided in step 714.

Motion vector derivation has a significant impact on encoding and decoding complexity. Indeed, for the current HEVC motion vector derivation, each predictor position (above, left, temporal, below left, above right) should be derived. Such derivation processes involve memory accesses, scalings, etc. . . . . Moreover, each predictor is compared to all other predictors in order to eliminate duplicate candidates Indeed such a derivation process may take up to 6 to 10% of the decoding process.

Moreover, the computational complexity of the motion vector derivation process described above increases compared to the HEVC technique since duplicate predictors are replaced by non-duplicate predictors. This process implies the derivation of new motion vectors (memory accesses, scalings) or the modification of the current one, and comparison of derived predictors with all other predictors in the motion predictors set.

SUMMARY OF THE INVENTION

The present invention has been devised to address one or more of the foregoing concerns.

According to a first aspect of the invention there is provided a method of decoding a bitstream comprising an encoded sequence of images, at least one portion of an image having been encoded by motion compensation with respect to a reference image portion, the method comprising for at least one image portion to be decoded: obtaining an index i of a selected motion information predictor of a first set of motion information predictors for decoding the image portion; generating a second set of motion information predictors consisting of said index number i of motion information predictors, wherein there are no duplicates among the i motion information predictors of said second set; and retrieving, for decoding of the image portion, the motion information predictor indexed by index i from the second set of motion information predictors.

Since the number of motion information predictors derived is limited to the index number i the number of processing operation is reduced. Moreover since each motion information predictor is only compared with previously derived motion information predictor of the new set the number of processing operations is further reduced and decoding efficiency is improved.

In an embodiment of the invention the step of generating a second set of motion information predictors comprises: obtaining a motion information predictor j for the second set of motion information predictors, comparing the obtained motion information predictor to any previously obtained motion information predictor, 0 to j−1, of the second set of motion information predictors; wherein in the case where the obtained motion information predictor j is different to any of the previously obtained motion information predictors 0 to j−1 the obtained motion information predictor is added to the second set of motion information predictors, otherwise the obtained motion information predictor is replaced with a motion information predictor different to any of the previously derived predictors j−1.

In an embodiment of the invention the replacement motion information predictor may be derived according to the value of the obtained motion information predictor j and data of a motion vector field storing encoded motion vectors of the current image and of previous images of the sequence.

The method may include a step of comparing the replacement motion information predictor with each of the previously obtained motion information predictors 0 to j−1, of the second set of motion information predictors and in the case where the replacement motion information predictor is not different to each of the previously obtained motion information predictors 0 to j−1, the method further comprising deriving another replacement motion information predictor.

The method may include a step of determining the number of motion information predictors in the first set of motion information predictors and retrieving an information item to provide the index i of the selected motion information predictor based on the number of motion information predictors.

According to a second aspect of the invention there is provided a method of encoding a sequence of images into a bitstream, at least one portion of an image being encoded by motion compensation with respect to a reference image portion, the method comprising for at least one image portion to encode obtaining a number x of motion information predictors taken from a first set of N motion information predictors, wherein the number x is based on a threshold parameter; and generating a second set of motion information predictors consisting of said number x of motion information predictors, wherein there are no duplicates among the x motion information predictors of said second set; and selecting, from among the second set of motion information predictors a motion information predictor for encoding the image portion; and encoding an information i to provide an index i of the selected motion information predictor.

In an embodiment of the invention the step of generating a second set of motion information predictors comprises: obtaining a motion information predictor j for the second set of motion information predictors, comparing the obtained motion information predictor to any previously obtained motion information predictor 0 to j−1 of the second set of motion information predictors; wherein in the case where the obtained motion information predictor j is different to any of the previously obtained motion information predictors 0 to j−1 the obtained motion information predictor is added to the second set of motion information predictors, otherwise the obtained information predictor is replaced with a motion information predictor different to any of the previously derived predictors j−1.

The threshold parameter may based on a maximum allowed number of motion information predictors, a rate distortion criterion and/or a threshold number of operations for obtaining the second set of motion information predictors.

In a particular embodiment each of the following steps may be considering as at least one elementary operation: the step of obtaining a motion information predictor j, the step of comparing the obtained motion information predictor to a previously obtained motion information predictor 0 to j−1 of the second set of motion information predictors, the step of replacing a motion information predictor j with a replacement motion information predictor, and the step of obtaining a replacement motion information predictor.

In an embodiment the item of information may be encoded on a number of bits dependent upon the number N of motion information predictors. The motion information predictor may be selected based on a rate distortion criterion A further aspect of the invention provides a method of deriving motion information of an image portion of an image predicted by motion prediction with respect to at least one reference image, the method comprising for said image portion: obtaining a number i of motion information predictors of a second set of motion information predictors taken in a first set of motion information predictors for decoding the image portion; generating said second set of motion information predictors consisting of said number i of motion information predictors, wherein there are no duplicates among the i motion information predictors of said second set.

Thus an embodiment of the invention may provide a method of decoding a bitstream comprising an encoded sequence of images, at least one portion of an image having been encoded by motion compensation with respect to a reference image portion, the method comprising for at least one image portion to be decoded: a step of deriving motion information of the image portion according to the further aspect, wherein the number i is an index of a selected motion information predictor in said first set of motion information predictors obtained during a encoding process applied to said image; and retrieving, for decoding of the image portion, the motion information predictor indexed by index i from the second set of motion information predictors.

Another embodiment of the invention may provide a method of encoding a sequence of images into a bitstream, at least one portion of an image being encoded by motion compensation with respect to a reference image portion, the method comprising for at least one image portion to decode a step of deriving motion information of the image portion according to the further aspect; and selecting, from among the set of motion information predictors a motion information predictor for encoding the image portion; and encoding an information item to provide an index i2 of the selected motion information predictor.

A third aspect of the invention may provide a decoding device for decoding a bitstream comprising an encoded sequence of images, at least one portion of an image having been encoded by motion compensation with respect to a reference image portion, the decoding device comprising: index obtaining means for obtaining an index i of a selected motion information predictor of a first set of motion information predictors for decoding the image portion; motion information set generation means for generating a second set of motion information predictors consisting of said index number i of motion information predictors, wherein there are no duplicates among the i motion information predictors of said second set; and retrieval means for retrieving, for decoding of the image portion, the motion information predictor indexed by index i from the second set of motion information predictors.

In an embodiment the motion information set generation means may include: means for obtaining a motion information predictor j for the second set of motion information predictors, comparison means for comparing the obtained motion information predictor to any previously obtained motion information predictor, 0 to j−1, of the second set of motion information predictors; wherein in the case where the obtained motion information predictor j is different to any of the previously obtained motion information predictors 0 to j−1 the motion information set generation means is operable to add the obtained motion information predictor to the second set of motion information predictors, otherwise the obtained motion information predictor is replaced with a replacement motion information predictor different to any of the previously derived predictors 0 to j−1.

In an embodiment the motion information set generation means may be operable to derive the replacement motion information predictor according to the value of the obtained motion information predictor j and data of a motion vector field storing encoded motion vectors of the current image and of previous images of the sequence.

In an embodiment the comparison means is operable to compare the replacement motion information predictor with each of the previously obtained motion information predictors 0 to j−1, of the second set of motion information predictors and in the case where the replacement motion information predictor is not different to each of the previously obtained motion information predictors 0 to j−1, the motion information set generation means is operable to derive another replacement motion information predictor.

In an embodiment the device includes means for determining the number of motion information predictors in the first set of motion information predictors and means for retrieving an information item to provide the index i of the selected motion information predictor based on the number of motion information predictors.

According to a fourth aspect of the invention there is provided an encoding device for encoding a sequence of images into a bitstream, at least one portion of an image being encoded by motion compensation with respect to a reference image portion, the encoding device comprising: means for obtaining a number x, of motion information predictors taken from a first set of N motion information predictors wherein the number x is based on a threshold parameter; and motion information set generation means for generating a set of motion information predictors consisting of said number x of motion information predictors, wherein there are no duplicates among the x motion information predictors of said second set; and selection means for selecting, from among the second set of motion information predictors a motion information predictor for encoding the image portion; and encoding means for encoding an information item to provide an index i of the selected motion information predictor.

In an embodiment the motion information set generation means comprises: means for obtaining a motion information predictor j for the second set of motion information predictors, comparison means for comparing the obtained motion information predictor to any previously obtained motion information predictor 0 to j−1 of the second set of motion information predictors; wherein in the case where the obtained motion information predictor j is different to any of the previously obtained motion information predictors 0 to j−1 the motion information set generation means is operable to add the obtained motion information predictor to the second set of motion information predictors, otherwise to replace the obtained information predictor with a motion information predictor different to any of the previously derived predictors 0 to j−1.

The threshold parameter may be based on a maximum allowed number of motion information predictors, a rate distortion criterion, and/or a threshold number of operations for obtaining the second set of motion information predictors.

In a particular embodiment each of the following steps is considered respectively as at least one elementary operation: the step of obtaining a motion information predictor j, the step of comparing the obtained motion information predictor to a previously obtained motion information predictor 0 to j−1 of the set of motion information predictors, the step of replacing a motion information predictor j with a replacement motion information predictor, and the step of obtaining a replacement motion information predictor.

In an embodiment the encoding means is operable to encode said item of information on a number of bits dependent upon the number N of motion information predictors.

In an embodiment the selection means is operable to select the motion information predictor based on a rate distortion criterion.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which: —

DETAILED DESCRIPTION OF THE INVENTION

Figure 1:
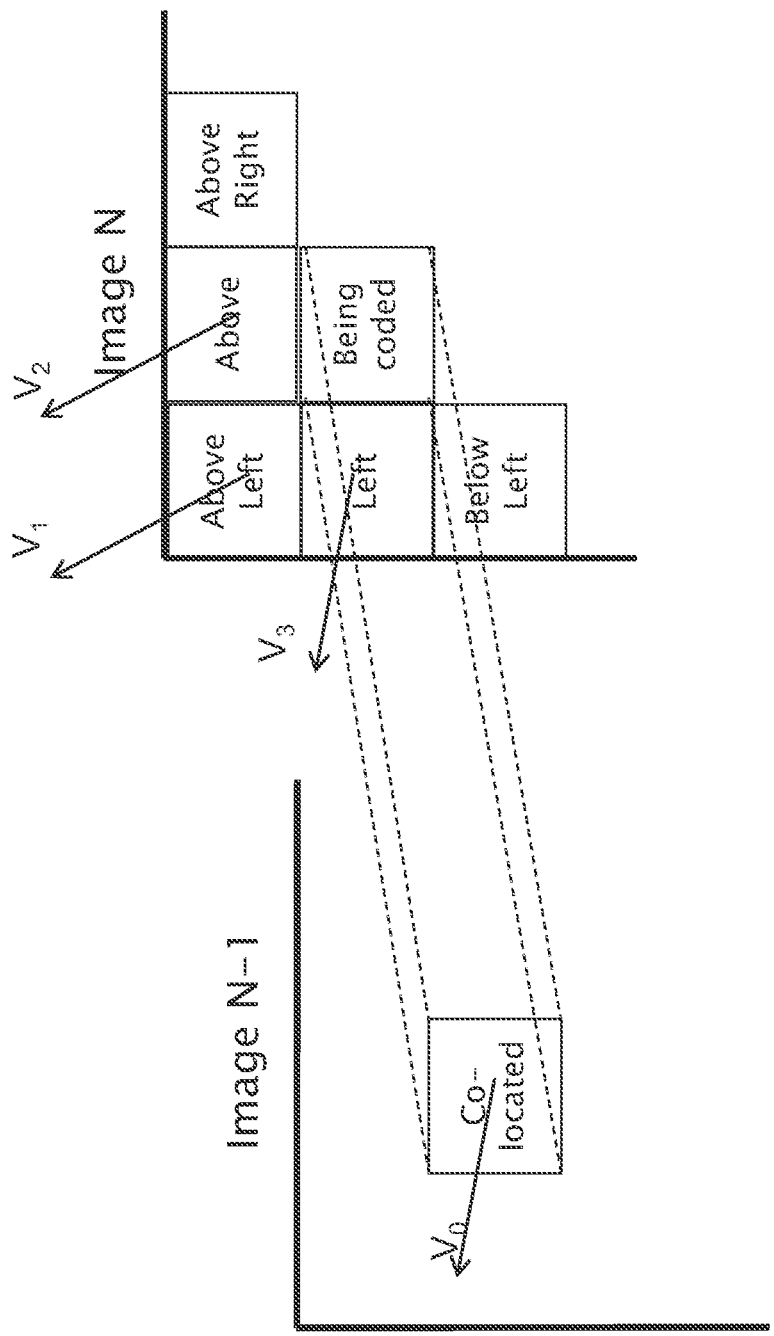
FIG. 1 is a schematic diagram of a set of motion vector predictors used in a motion vector prediction process.
Figure 2:
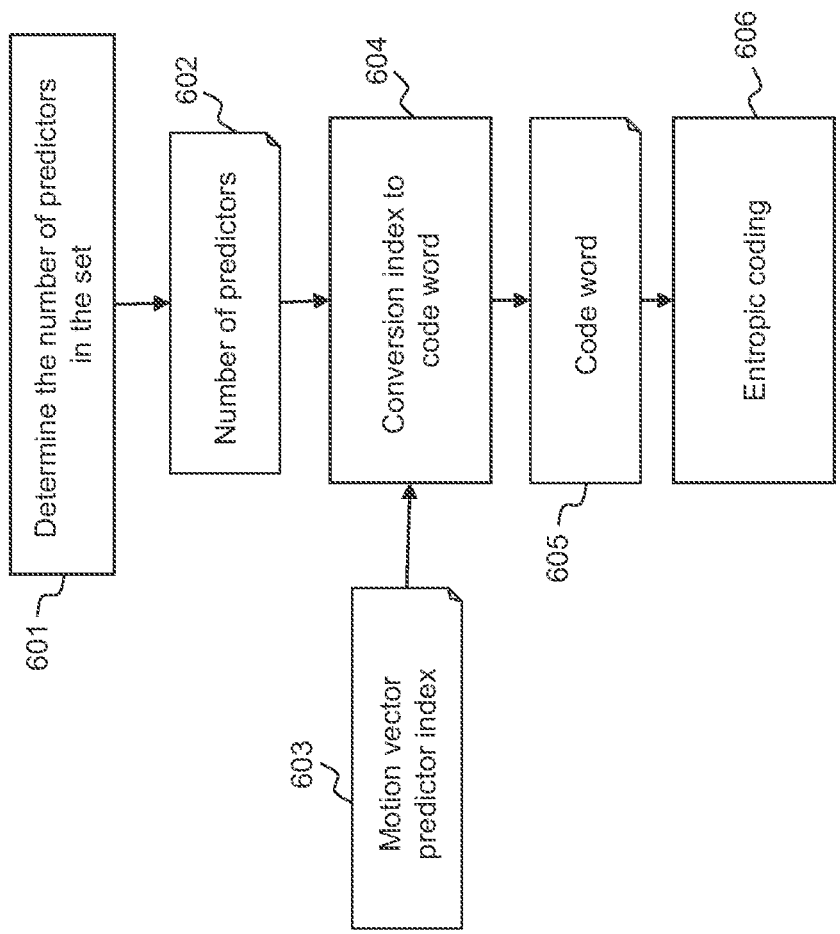
FIG. 2 is a flow chart illustrating steps of an encoding process of the prior art.
Figure 3:
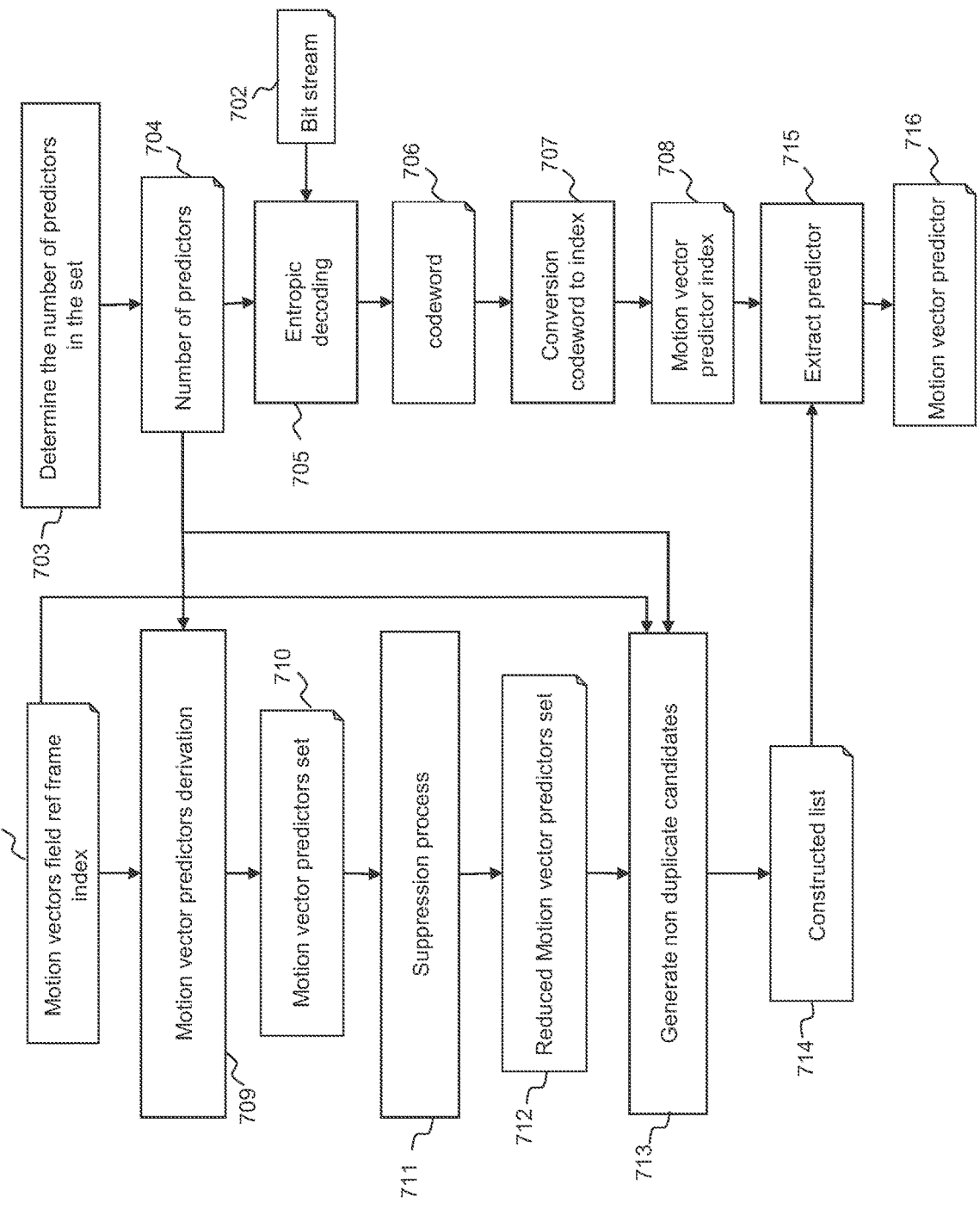
FIG. 3 is a flow chart illustrating steps of an decoding process of the prior art.
Figure 4:
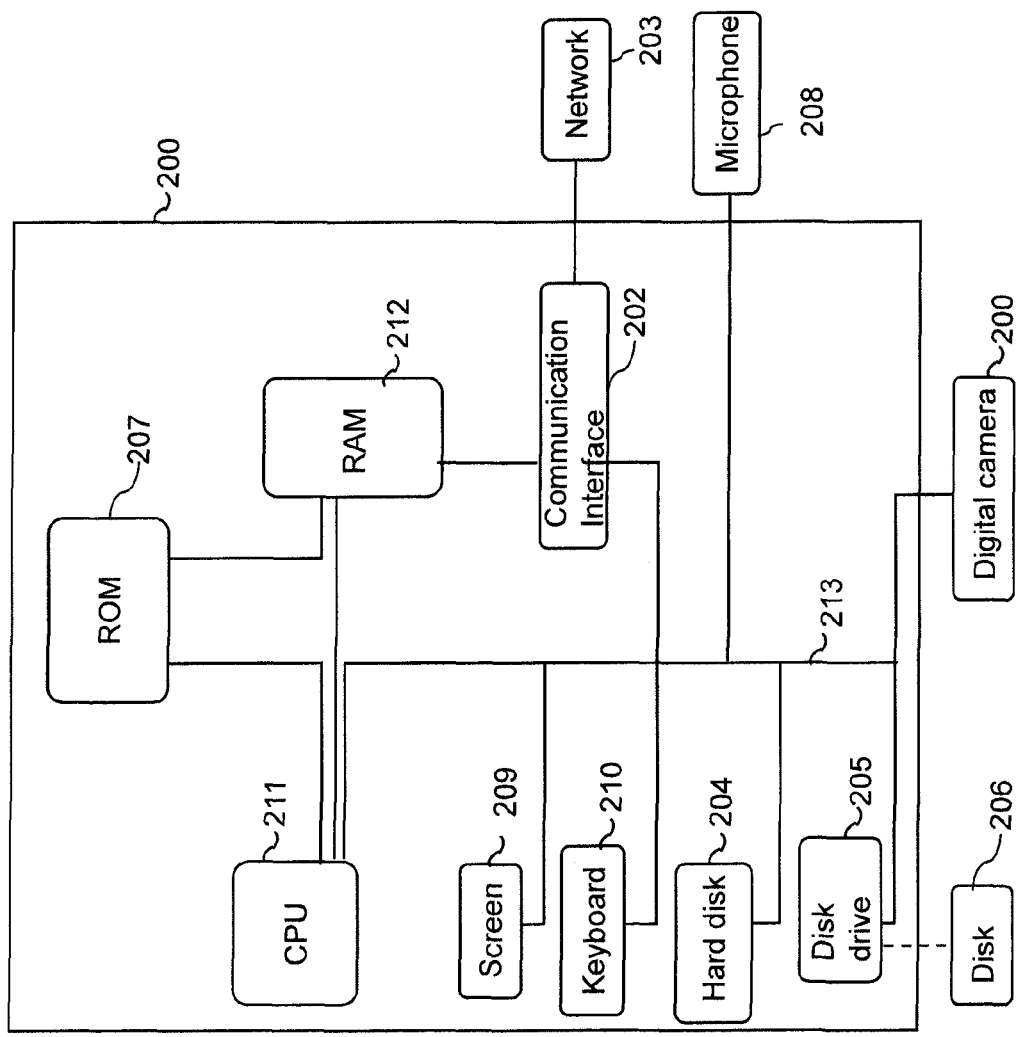
FIG. 4 is a block diagram illustrating components of a processing device in which embodiments of the invention may be implemented.

FIG. 4 schematically illustrates a processing device 200 configured to implement at least one embodiment of the present invention. The processing device 200 may be a device such as a micro-computer, a workstation or a light portable device. The device 200 comprises a communication bus 213 to which there are preferably connected:

- a central processing unit 211, such as a microprocessor, denoted CPU;
- a read only memory 207, denoted ROM, for storing computer programs for implementing the invention;
- a random access memory 212, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and
- a communication interface 202 connected to a communication network 203 over which digital data to be processed are transmitted.

Optionally, the apparatus 200 may also include the following components:

- a data storage means 204 such as a hard disk, for storing computer programs for implementing methods of one or more embodiments of the invention and data used or produced during the implementation of one or more embodiments of the invention;
- a disk drive 205 for a disk 206, the disk drive being adapted to read data from the disk 206 or to write data onto said disk;
- a screen 209 for displaying data and/or serving as a graphical interface with the user, by means of a keyboard 210 or any other pointing means.

The apparatus 200 can be connected to various peripherals, such as for example a digital camera 200 or a microphone 208, each being connected to an input/output card (not shown) so as to supply multimedia data to the apparatus 200.

The communication bus provides communication and interoperability between the various elements included in the apparatus 200 or connected to it. The representation of the bus is not limiting and in particular the central processing unit is operable to communicate instructions to any element of the apparatus 200 directly or by means of another element of the apparatus 200.

The disk 206 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 207, on the hard disk 204 or on a removable digital medium such as for example a disk 206 as described previously. According to a variant, the executable code of the programs can be received by means of the communication network 203, via the interface 202, in order to be stored in one of the storage means of the apparatus 200 before being executed, such as the hard disk 204.

The central processing unit 211 is adapted to control and direct the execution of the instructions or portions of software code of the program or programs according to the invention, instructions that are stored in one of the aforementioned storage means. On powering up, the program or programs that are stored in a non-volatile memory, for example on the hard disk 204 or in the read only memory 207, are transferred into the random access memory 212, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 5:
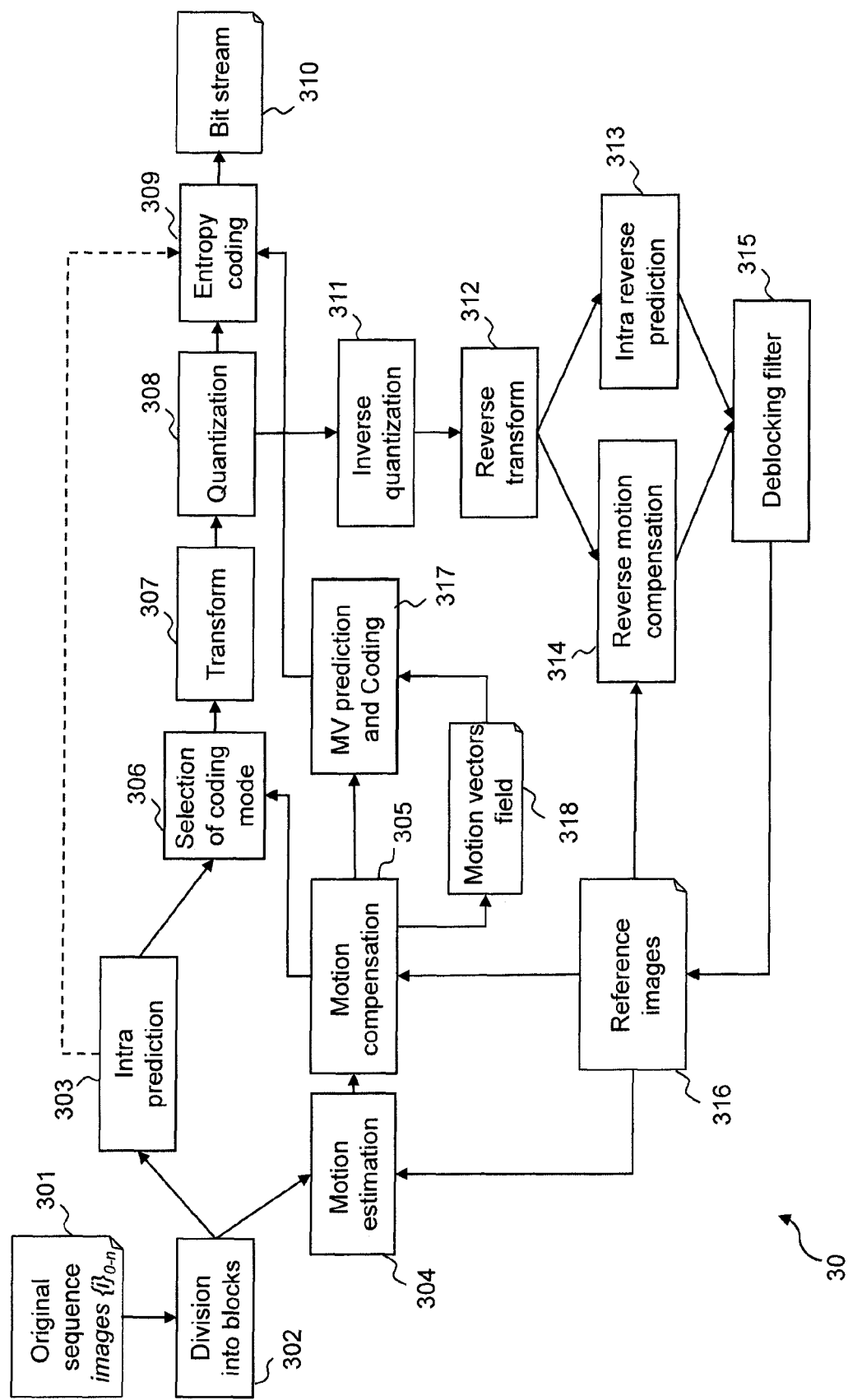
FIG. 5 is a block diagram illustrating components of an encoder device according to embodiments of the invention.

FIG. 5 illustrates a block diagram of an encoder according to at least one embodiment of the invention. The encoder is represented by connected modules, each module being adapted to implement, for example in the form of programming instructions to be executed by the CPU 211 of device 200, at least one corresponding step of a method implementing at least one embodiment of the invention.

An original sequence of digital images i0 to in 301 is received as an input by the encoder 30. Each digital image is represented by a set of samples, known as pixels. A bitstream 310 is output by the encoder 30 after implementation of the encoding process.

The bitstream 310 comprises a plurality of encoding units or slices, each slice comprising a slice header for transmitting encoding values of encoding parameters used to encode the slice and a slice body, comprising encoded video data.

The input digital images i0 to in 301 are divided into blocks of pixels by module 302. The blocks are image portions and may be of variable sizes (e.g. 4×4, 8×8, 16×16, 32×32). A coding mode is selected for each input block. There are two families of coding modes: coding modes based on spatial prediction coding (Intra prediction), and coding modes based on temporal prediction (Inter coding, Bidir, SKIP). The possible coding modes are tested.

Module 303 implements Intra prediction, in which the given block to be encoded is predicted by a predictor computed from pixels of the neighbourhood of said block to be encoded. An indication of the Intra predictor selected and the difference between the given block and its predictor is encoded to provide a residual if the Intra coding is selected.

Temporal prediction is implemented by motion estimation module 304 and motion compensation module 305. Firstly a reference image from among a set of reference images 316 is selected, and a portion of the reference image, also called reference area, which is the closest area to the given block to be encoded, is selected by the motion estimation module 304. Motion compensation module 305 then predicts the block to be encoded using the selected area. The difference between the selected reference area and the given block, also called a residual block, is computed by the motion compensation module 305. The selected reference area is indicated by a motion vector.

Thus in both cases (spatial and temporal prediction), a residual is computed by subtracting the prediction from the original predicted block.

In the INTRA prediction implemented by module 303, a prediction direction is encoded. In the temporal prediction, at least one motion vector is encoded.

An information relative to the motion vector and the residual block is encoded if the Inter prediction is selected. To further reduce the bitrate, the motion vector is encoded by difference with respect to a motion vector predictor. A set of motion vector predictors, also called motion information predictors, is obtained from the motion vectors field 318 by a motion vector prediction and coding module 317.

Figure 10:
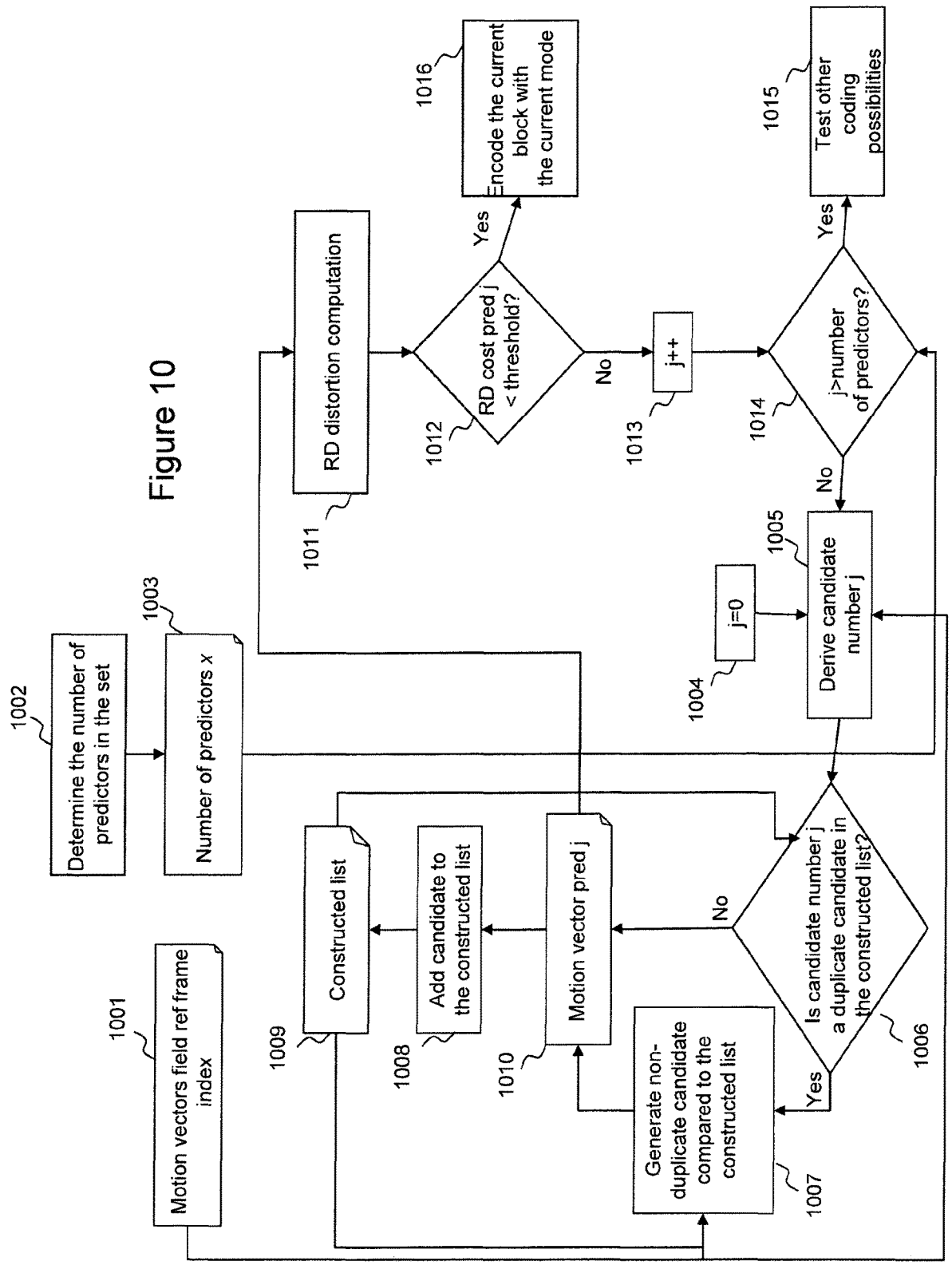
FIG. 10 is a flow chart illustrating an encoding process according to an embodiment of the invention.
Figure 11:
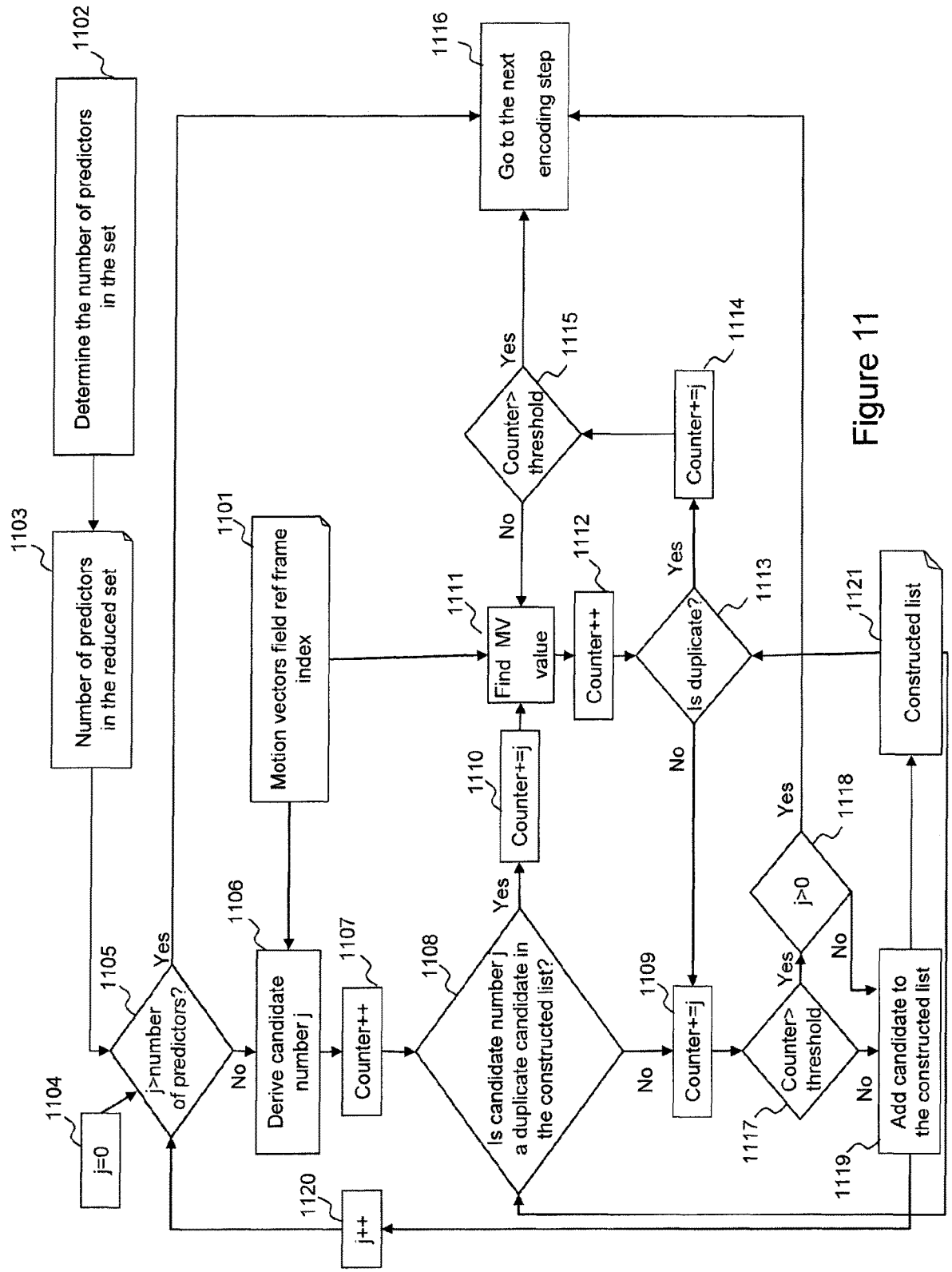
FIG. 11 is a flow chart illustrating an encoding process according to a further embodiment of the invention.

The set of motion vector predictors used to select a best motion vector predictor to encode a current motion vector is generated as explained in more detail hereafter with respect to FIGS. 10 and 11. For a given current block to be encoded, in some embodiments of the invention a number N of motion vector predictors is determined, and consequently the index of the selected motion vector predictor, which is an item of information representative of the selected motion vector predictor, can be encoded using a predetermined number of bits according to the number N of motion vector predictors. This predetermined number of bits can be also retrieved by the decoder even in case of losses, therefore it may be ensured that the decoder will be able to parse the bitstream even in case of errors or losses. The N motion vector predictors are selected according to various embodiments of the invention to be all different from one another so as to enhance the compression efficiency.

Determining the number N of motion vector predictors and of the corresponding number of bits to encode the index of the motion vector predictor can be applied either for the entire sequence, or for a group of images of the sequence, or at the block level depending on an encoding parameters such as the block size or the encoding mode. For example, a first number of motion vector predictors $N_1$ can be used for the blocks encoded using Inter prediction for which a residual block is encoded, and a second number of motion vector predictors $N_2$ can be used for the blocks encoded using the SKIP mode, for which only a motion vector is encoded, but no residual block. The respective numbers of motion vector predictors $N_1$ and $N_2$ can be for example signaled in the bitstream by inserting them in a header, such as the slice header, or in any appropriate metadata field.

The encoder 30 further comprises a module 306 for selection of the coding mode 306, which uses an encoding cost criterion, such as a rate-distortion criterion, to determine which is the best mode between the spatial prediction mode and the temporal prediction mode. In order to further reduce redundancies a transform 307 is applied to the residual block, the transformed data obtained is then quantized by module 308 and entropy encoded by module 309. Finally, the encoded residual block of the current block to encode is inserted into the bitstream 310, along with the information relative to the predictor used—the index of the selected motion vector predictor. For the blocks encoded in 'SKIP' mode, only a reference to the predictor is encoded in the bitstream, without any residual block.

The encoder 30 further performs decoding of the encoded image in order to produce a reference image for the motion estimation of the subsequent images. This enables the encoder and the decoder receiving the bitstream to have the same reference frames. The module 311 performs inverse quantization of the quantized data, followed by an inverse transform 312. The reverse intra prediction module 313 uses the prediction information to determine which predictor to use for a given block and the reverse motion compensation module 314 actually adds the residual obtained by module 312 to the reference area obtained from the set of reference images 316. Optionally, a deblocking filter 315 is applied to remove the blocking effects and enhance the visual quality of the decoded image. The same deblocking filter is applied at the decoder, so that, if there is no transmission loss, the encoder and the decoder apply the same processing.

Figure 6:
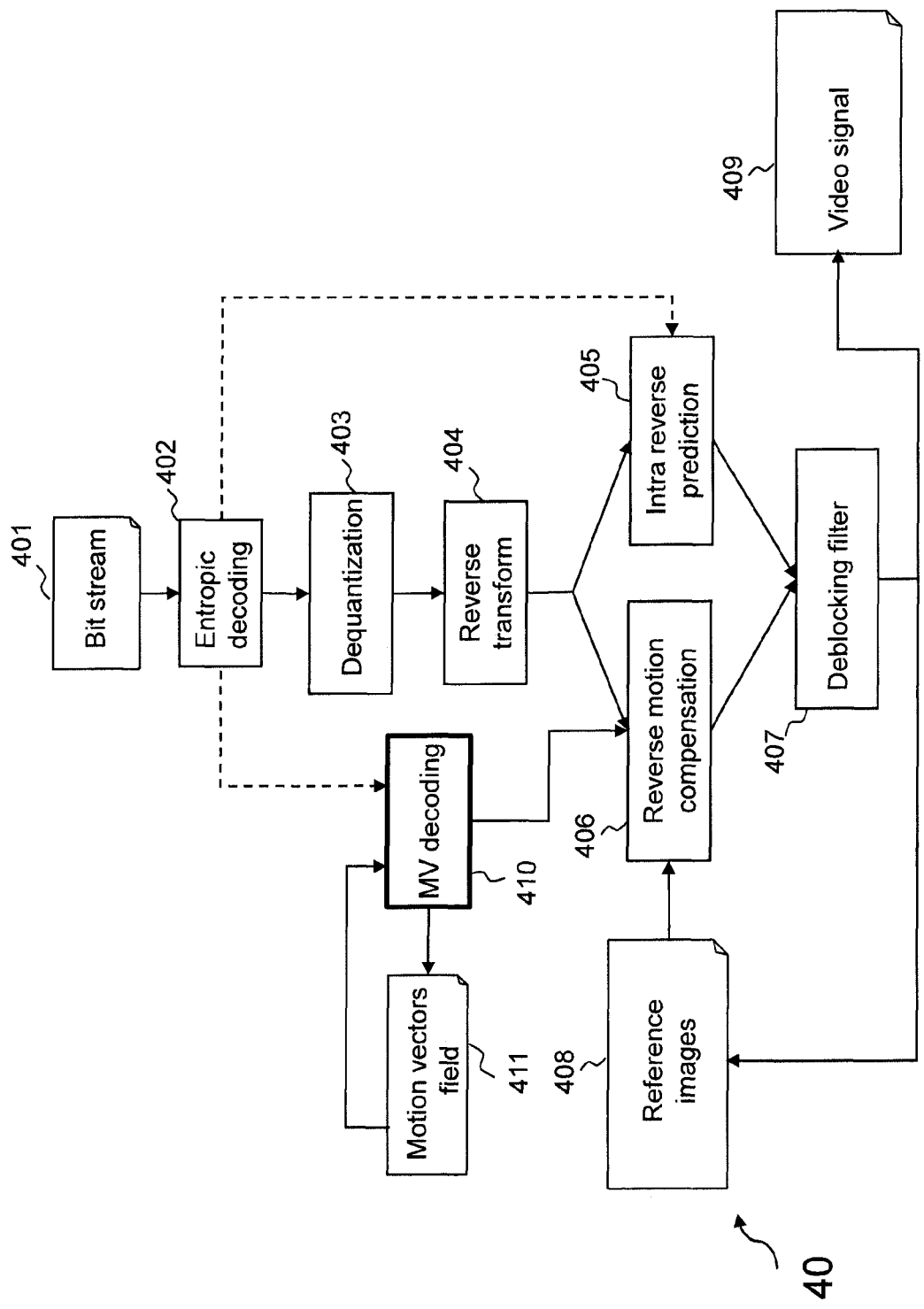
FIG. 6 is a block diagram illustrating components of a decoder device according to embodiments of the invention.

FIG. 6 illustrates a block diagram of a decoder 40 according to at least one embodiment of the invention. The decoder is represented by connected modules, each module being adapted to implement, for example in the form of programming instructions to be executed by the CPU 211 of device 200, a corresponding step of a method implementing an embodiment of the invention.

The decoder 40 receives a bitstream 401 comprising encoding units, each one being composed of a header containing information on encoding parameters and a body containing the encoded video data. As explained with respect to FIG. 5, the encoded video data is entropy encoded, and the motion vector predictors' indexes are encoded, for a given block, on a predetermined number of bits. The received encoded video data is entropy decoded by module 402. The residual data are then dequantized by module 403 and then a reverse transform is applied by module 404 to obtain pixel values.

The mode data are also entropy decoded and based on the mode, an INTRA type decoding or an INTER type decoding is performed.

In the case of INTRA mode, an INTRA predictor is determined by intra reverse prediction module 405 based on the intra prediction mode specified in the bitstream.

If the mode is INTER, the motion prediction information is extracted from the bitstream so as to find the reference area used by the encoder. The motion prediction information is composed of the reference frame index and the motion vector residual. The motion vector predictor is added to the motion vector residual in order to obtain the motion vector by motion vector decoding module 410.

Motion vector decoding module 410 applies motion vector decoding for each current block encoded by motion prediction. The method applied comprises determining the number $N_{max}$ of motion vector predictors used and retrieving the motion vector predictor index encoded on a number of bits dependent on $N_{max}$. The motion vector decoding module 410 generates a set of motion vector predictors according to embodiments of the invention explained hereafter with reference to FIG. 7.

Once the index of the motion vector predictor for the current block has been obtained the actual value of the motion vector associated with the current block can be decoded and used to apply reverse motion compensation by module 406. The reference area indicated by the decoded motion vector is extracted from a reference image 408 to apply the reverse motion compensation 406. The motion vector field data 411 is updated with the decoded motion vector in order to be used for the inverse prediction of the next decoded motion vectors.

Finally, a decoded block is obtained. A deblocking filter 407 is applied, similarly to the deblocking filter 315 applied at the encoder. A decoded video signal 409 is finally provided by the decoder 40.

Figure 7:
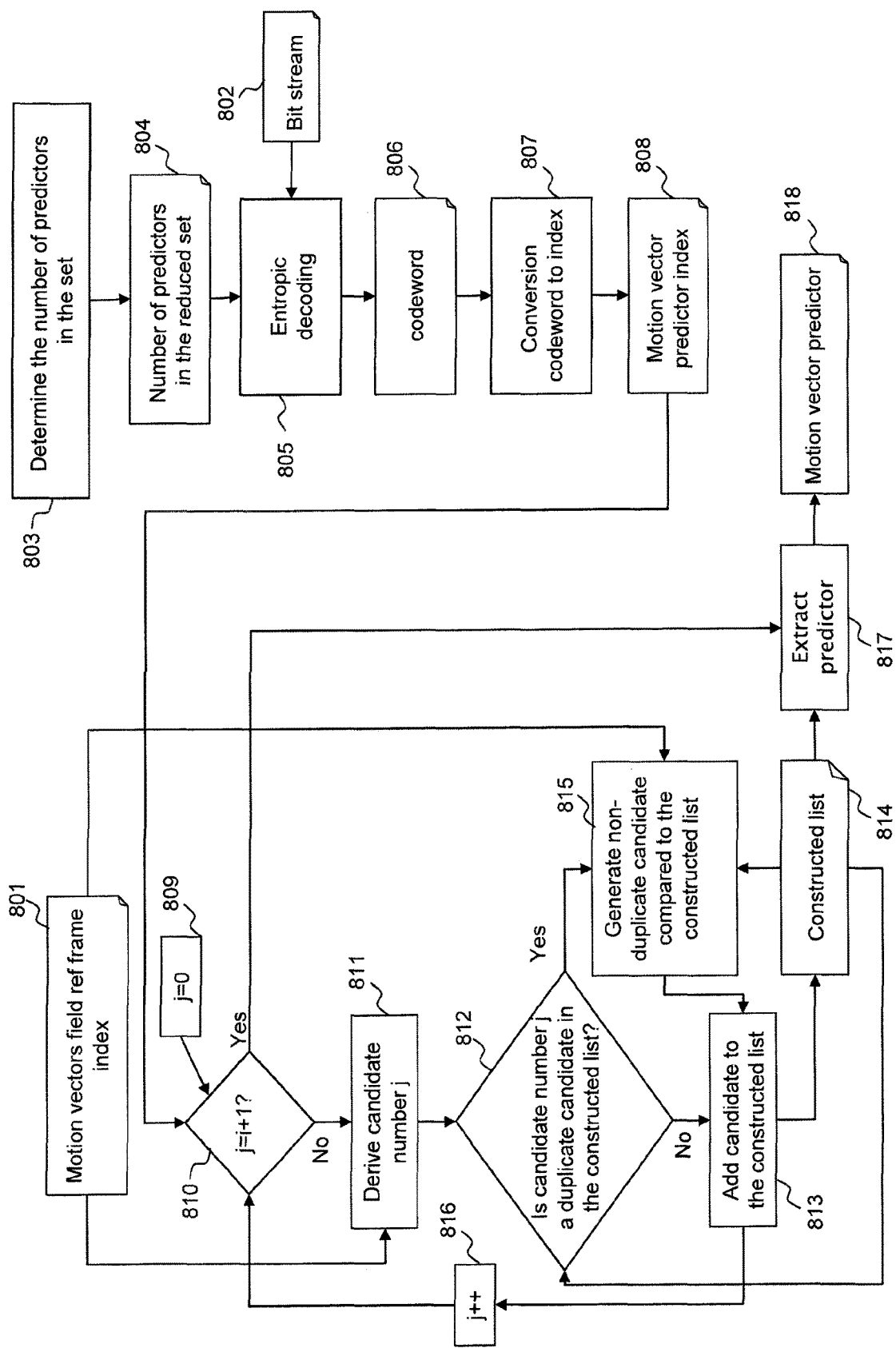
FIG. 7 is a flow chart illustrating steps of a decoding process according to an embodiment of the invention.

FIG. 7 is a flow chart illustrating steps of a decoding process according to an embodiment of the invention. In step 803 the number N of motion information predictors 804 in a set of motion information predictors is determined. The number of predictors in the set is determined based on data from the current slice. Based on this this number N, in step 805 the entropy decoding module extracts the code word 806 from the bitstream 802. This code word 806 is then converted in step 807 to the selected motion vector predictor index 808. The selected motion vector predictor index is denoted i in the description which follows. This index i of predictor may be equal for example to 0, 1, 2, 3 and 4.

Indeed, for example, the maximum number of predictors in the current implementation of HEVC is 5.

In general terms, according to the embodiment of the invention, for each motion information predictor j from j=0 to j=index i of the set of N motion information predictors the method includes:

deriving the motion information predictor j;
determining if the derived motion information predictor j is different to any previously derived motion information predictors 0 to j−1 of the set of motion information predictors;

and:
if it is determined that the derived motion information predictor j is not different to any previously derived motion information predictors 0 to j−1 the method further includes generating a motion information predictor for predictor j which is different to any previously derived predictor and adding the generated predictor to a new set of predictors,
otherwise, if it is determined that the predictor j is different to any previously derived predictor, the derived predictor j is added to the new set of predictors; and
retrieving, for decoding of the image portion, the value of the motion information predictor j where j=i from the set of motion information predictor values.

These method steps are implemented by modules 808 to 817 of FIG. 7. Module 809 initializes the value of the motion information predictor counter variable "j", indexing the predictors in the set, to 0. The selected predictor index i which has been retrieved in steps 805 to 807 described above is transmitted to a decision module 810. The decision module 810 checks if predictor counter variable "j" is equal to "i+1". When j is equal to 0, the module 810 returns the answer "no". Next, the module 811 derives the candidate number "j". An example of a process for derivation of predictors will be described in more detail in a later section. For the first iteration of the method, when j=0, the predictor candidate from the set of predictors is the first predictor indexed 0.

Next, the decision step 812 checks if the derived predictor for predictor number "j" is a duplicate candidate compared to the predictors already inserted in the constructed list of predictors 814. For the first predictor (j=0), the module 812 will return the answer "no" because no predictor is yet present in the constructed list 814. When the decision module 812 returns the value "no", the derived predictor "j" is inserted in step 813 in the constructed list 814. The counter variable "j" is then incremented in step 816 before the method returns to the decision step 810.

If the decision step 812 returns the value "yes" that the derived predictor for predictor number "j" is a duplicate of any previously derived predictor j=0 to j−1 in the constructed list, then a non-duplicate predictor is generated for the predictor j in step 815. The module 815 performing the step may be combination of module 811 where a predictor j is generated and module 812 where the generated predictor j is compared with other previously derived predictors in the constructed list where at the end of the process the generated predictor is a non-duplicate predictor—i.e. the module 815 derives a predictor value according to the data of the motion vector field and the value of the current duplicate predictor (if needed), and that this module checks if this value is a duplicate candidate or not. To check if this generated predictor is a duplicate value, the predictor is compared to all predictors which have already been derived and added to the constructed list 814. If the generated value is again a duplicate predictor, another predictor value is derived until a non-duplicate predictor is found. At the end of the process in step 815, the non-duplicate predictor is added in step 813 to the constructed list 814 and the counter variable "j" is incremented in the module 816.

When the decision module 810 returns the value "yes" (j=i+1) then the module the process proceeds to step 817 in which the selected predictor indexed "i" 818 is extracted from the constructed list of predictors. In accordance with the embodiment of the present invention this predictor is the last predictor added in the constructed list 814.

Accordingly in this embodiment of the invention, the decoding method involves taking the last predictor of the constructed list 814 and rather than selecting from a complete set of predictors comprising, generally, a number of predictors greater than i the predictor at the position given by the motion vector predictor index "i". With the invention, only "i" predictors need to be derived. Consequently, the decoding time dedicated to the motion vector derivation process can be significantly reduced compared to prior art techniques.

Figure 8:
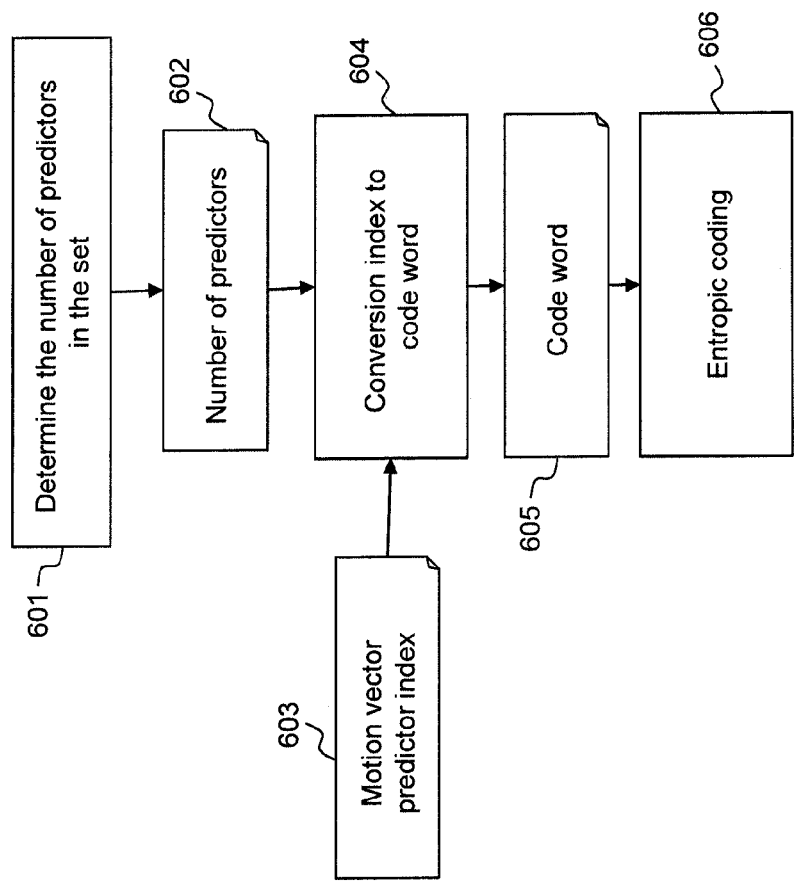
FIG. 8 is a flow chart illustrating steps of a general encoding process according to embodiments of the invention.

FIG. 8 is a flow chart illustrating steps of a general encoding process in which one or more embodiments of the invention may be implemented. In step 601 the number of predictors in a predictor set is determined according to the data which comes from the current slice in order to provide the number of predictors 602. The predictor index i 603 of the best predictor selected based on, for example rate distortion (RD) criterion is converted in step 604 to a code word 605 which is then entropy coded in step 606.

The encoder may derive all the predictors in the predictors set to give the best coding efficiency since all the coding possibilities may be estimated at the encoder side.

Figure 9:
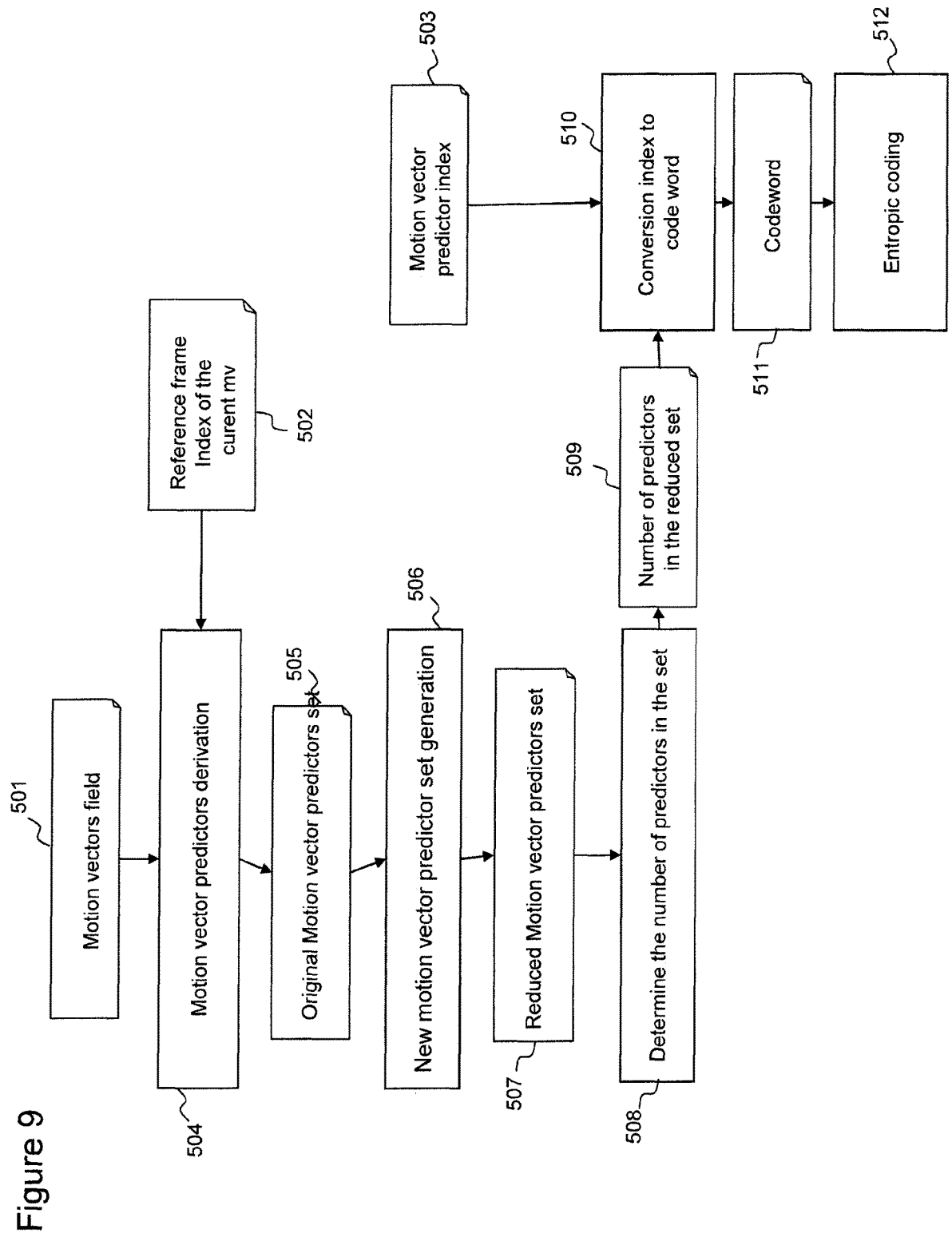
FIG. 9 is a flow chart illustrating steps of an encoding process in which embodiments of the invention may be implemented.

FIG. 9 is a flow chart illustrating steps of an encoding process in which embodiments of the invention may be implemented. In this flow chart, module 501 is the same as module 318 of FIG. 5, and module 512 is the same as module 309 of FIG. 5.

The step of derivation of motion vector predictors 504 generates the motion vector predictors set 505 by taking into account the current reference frame index 502 if needed (Inter mode). Then, a motion vector set generation process as will be described below can be applied in step 506 to the motion vectors set to produce a newly constructed list of x motion vector predictors or reduced motion vector predictors set 507. In step 508 the number of predictors x (represented by reference 509) in this reduced predictor set 507 is determined. Then, the best predictor is selected with the RD selection criterion and its related index i 503 is received by the module of predictor index signalling. If the number of predictors 509 is higher than one, the index i of the best predictor 403 is converted in the module 510 to a code word 511. This code word, if it exists, is then entropy coded in step 512.

According to embodiments of the present invention the encoder complexity and encoding time may be minimised by restricting the amount of predictors derived. In order to limit the impact on the coding efficiency, this restriction may depend on several parameters. For example, the block size, the encoding mode Inter/Merge/Merge Skip can be taken into account to reduce the encoding complexity. Moreover the number of predictors derived can evolve according to the encoding time already spent to encode the current frame.

In accordance with some embodiments of the invention, the encoder can limit the number of predictors derived for all Inter modes. For example, only one predictor may need to be derived to obtain a compliant bitstream instead of deriving the whole set of predictors as is done in HEVC derivation processes of the prior art.

An early decision process may be implemented at encoder side. The main advantage in applying such a process is that a predictor is derived only if that predictor needs to be tested. The reduction in computational complexity results from the reduced number of predictors derived.

An example of an encoding method implementing an early decision algorithm according to an embodiment of the invention is illustrated in FIG. 10.

In step 1002 the number of predictors in the current set is determined to provide a number of predictors 1003. Then, the predictor counter variable "j" is initialized to the value 0 in step 1004. In step 1005 the module derives the predictor related to the index "j". In step 1006 the module checks if this derived predictor candidate j is a duplicate predictor or not. The derived predictor candidate is compared with each previous derived predictor candidate j=0 to j=j-1 in the constructed set. If the derived predictor candidate is a duplicate predictor of another previously added predictor j=0 to j=j-1, in step 1007 the module generates a non-duplicate candidate for the predictor number "j" 1010. If the decision module returns the value "no", the motion vector number "i" 1010 is the predictor derived in step 1005. This predictor 1010 is then added to the constructed list of predictors. In step 1006 the decision module and the module generating non-duplicate predictors use this constructed list to determine if generated predictor is a duplicate of a predictor already in the constructed list of predictors.

The motion vector predictor "j" 1010 is then used for a rate distortion computation in step 1011. The module 1012 checks if the RD cost for motion vector predictor j is inferior to a threshold. If it is, the current block is encoded with the current tested block size, the current tested mode and the predictor number "j" in step 1016. Otherwise the variable "j" is incremented in step 1013. In step 1014 the module checks if the value of j has reached a maximum number of predictors. In the case where the maximum number of predictors has been reached, the encoder will proceed to test other coding possibilities; otherwise the algorithm will return to step 1005 to derive the current predictor number "j".

A further embodiment of an encoding method for limiting computational complexity will now be described with reference to FIG. 11. In this embodiment the algorithm involves predetermining a threshold in terms of number of elementary operations. This threshold can depend on an encoding and decoding complexity target. Moreover, this threshold can be dependent on the block size. Indeed, the derivation process of the motion vector predictors set has less impact in terms of number of operations per pixel for high block size than for low block size. The threshold could be defined, for example by compromising between coding efficiency and the complexity.

FIG. 11 is a flow chart illustrating steps of an encoding algorithm according to this further embodiment of the invention. For the purposes of the description, we consider that a comparison between 2 motion vectors is equivalent to one elementary operation and the derivation of one predictor value is equivalent to one elementary operation. This may be modified according to the implementation of the algorithm for different embodiments of the invention. In the algorithm of the present further embodiment, the variable "operation counter" gives the number of operations at the current instant. The aim of this algorithm is to derive a list of predictors with a restricted number of operations.

In step 1102 the module determines the number of predictors 1103 in the set. The predictor counter variable "j" is initialized to a zero value in step 1104. Next in step 1106, the module derives the value of the predictor indexed "j". In this example, this derivation represents one elementary operation, so the variable "operation counter" is incremented. Next in step 1108 the module checks if the predictor indexed "j" is a duplicate candidate compared to the predictors already present in the constructed list 1121. For the first predictor (j=0) no duplicate checking is performed since no predictors have been previously derived for the constructed list. For all cases, if the module in step 1108 returns the value "no", the variable "operation counter" is incremented by the number of predictors in the constructed list (1121) which is equal to the variable "j" since this corresponds to the number of comparison operations between predictors to be performed. If this "operation counter" indicates a count value which is superior to the defined operation count threshold 1117 and if predictor number "j" is superior to 0, then the derivation process is stopped and the encoder proceeds to the next encoding step. Otherwise the predictor number "j" is added in step 1119 to the constructed list of predictors 1121. Then, the predictor count variable "j" is incremented. In step 1105, the module checks if predictor number "j" is higher than the maximum number of predictors in the set 1103. If that is the case, the derivation process needs fewer operations than the defined threshold.

If in step 1108 the module identifies that the current predictor "j" is a duplicate candidate, the variable "operation counter" is incremented by the value "j" in step 1110. And in step 1111 the module obtains a motion vector value for the current predictor "j". The variable "operation counter" is then incremented in step 1112. Then, in step 1113 the module checks if the obtained motion vector predictor value is a duplicate candidate or not by comparing the obtained motion vector predictor j with previously obtained motion vector predictor in the constructed list 1121. If decision step 1113 returns true, that the motion vector predictor is a duplicate, the variable "operation counter" is incremented by "j" and in step 1115, the module 1115 checks if the value of the operation counter is higher than the operation count threshold. If not, the algorithm will return to step 1111. Otherwise, the derivation process ends, then the encoder will proceed to the next encoding step 1116.

In the algorithm illustrated in FIG. 11 the generation of a non-duplicate in FIG. 11 is represented by the steps 1111 and 1113.

Figure 12:
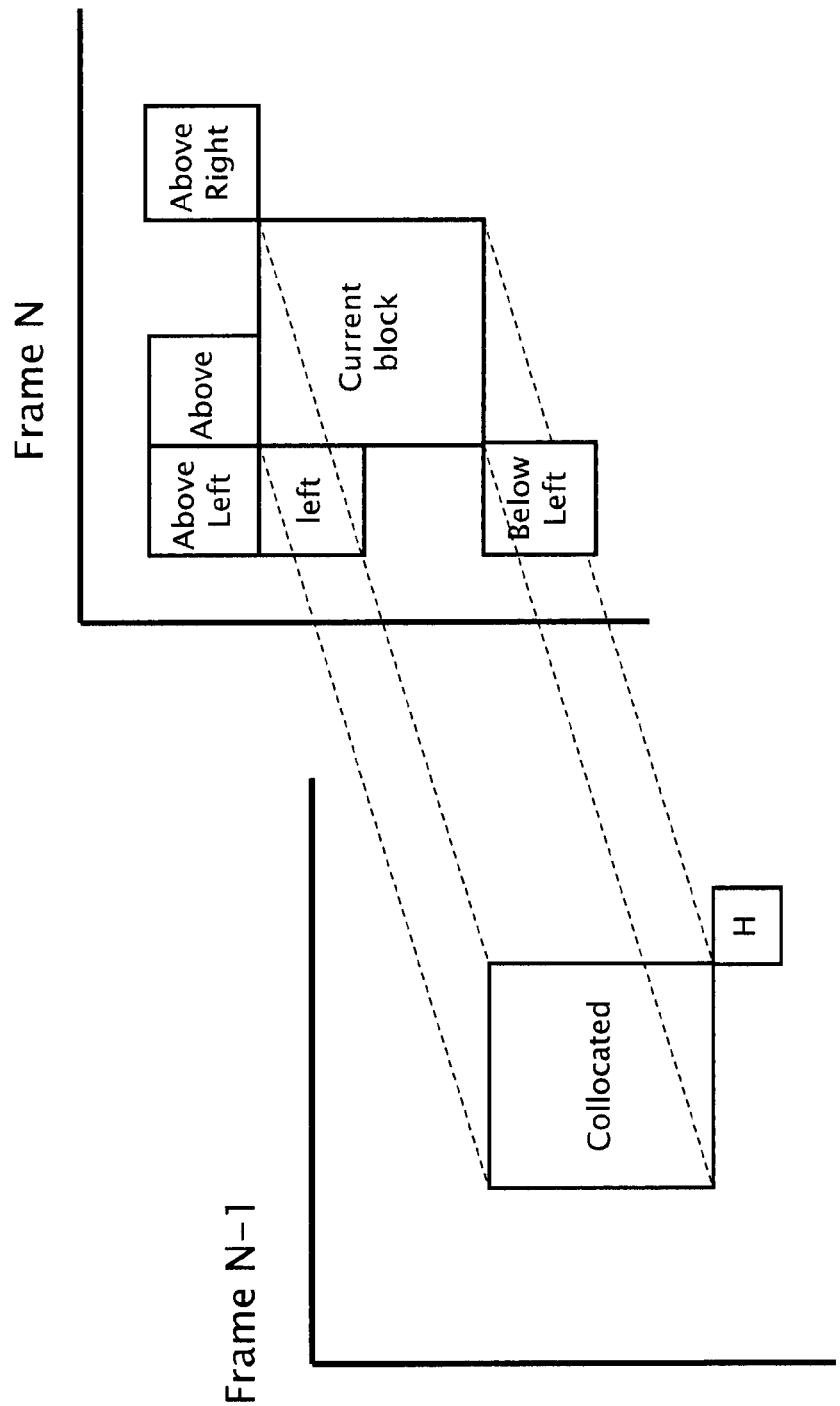
FIG. 12 is a schematic diagram of a set of motion vector predictors used in a motion vector prediction process.

An example of a process of derivation of motion vector predictors for both the encoding and the decoding processes will now be described with reference to FIG. 12 which illustrates a set of motion vector predictors in HEVC coding. In the predictor set represented in FIG. 12, the two spatial motion vectors of the Inter mode are chosen from among those blocks which are above and left of the block to be encoded including the above corner blocks and left corner blocks. The left predictor is selected from among the blocks "Below Left" and "Left". In this specific order, the following conditions are evaluated until a motion vector value is found.

1. The motion vector associated with the same reference list and the same reference picture
2. The motion vector associated with another reference list and the same reference picture
3. The scaled motion vector associated with the same reference list and a different reference picture
4. The scaled motion vector associated with another reference list and a different reference picture If no value is found, the "left" predictor is considered as unavailable. In that case, it means that the related blocks were Intra coded or these blocks do not exist. It means that in a first step the neighbouring block has been checked to determine if this predictor is in the list or not. (The availability of the predictor does not depend on the value of predictor).

The "above" predictor is selected from among "Above Right", "Above" and "Above left" in this specific order, with the same conditions as described above.

If no value is found the "above" predictor is considered as unavailable. If all these steps don't give a different value than the predictor left, the following conditions are evaluated until a motion vector value different than the predictor left is found
1. The motion vector associated with collocated block of the above predictor in a reference frame
2. The duplicate motion vector shifted by 2 to remove the sub pixel accuracy (the two components are approximated by the closest pixel values)
3. The duplicate motion vector shifted by 1 to remove the quarter pixel accuracy (the two components are approximated by the closest half pixel values)
4. Offset is added to the duplicate motion vector This last step provides a non-duplicate value.

The temporal motion predictor comes from the nearest reference frame in low delay configuration. In case of B frames, 2 motion vectors are considered for the bottom right block of the collocated block. One is in the first list "L0" and one in the second list "L1". If both motion vectors exist, the motion vector which has the shortest temporal distance is selected. If both predictors have the same temporal distance, the motion from "L0" is selected. The collocated motion vector selected is then scaled, if needed, according to its temporal distance and to the temporal distance of the encoded motion vector. If no collocated predictor exists, the predictor is considered as unavailable. For hierarchical B frames coding, 2 collocated motion vectors can be considered. Both come from the future reference frame. The motion vector which crosses the current frame is selected. If both predictors cross the current frame, the motion vector which has the shortest temporal distance is selected. If both predictors have the same temporal distance, the motion from the first list "L0" is then selected. The collocated motion vector selected is then scaled, if needed, according to its temporal distance and to the temporal distance of the encoded motion vector. For all motion temporal motion vector checked, the same criterion could be used.

In the proposed scheme which solves the parsing issue the temporal predictor is considered as available. If no bottom right collocated predictor exists or if this predictor is a duplicate predictor the following conditions are evaluated until a motion vector value different than the predictor left is found
1. The centered collocated motion vector is checked.
2. The below left Motion vector of the collocated block
3. The above right Motion vector of the collocated block
4. The above left Motion vector of the collocated block
5. The zero value
6. The duplicate motion vector shifted by 2 to remove the sub pixel accuracy (the two components are approximated by the closest pixel values)
7. The duplicate motion vector shifted by 1 to remove the quarter pixel accuracy (the two components are approximated by the closest half pixel values)
8. Offset is added to the duplicate motion vector At the end of this process of derivation of motion vector predictors, the set of predictors generated can contain 1, 2 or 3 predictors.

The Merge mode is a particular form of Inter coding. Two modes are considered. The first one is the Merge Skip mode. In that case, only the index of a predictor (if needed) is transmitted in the bit stream. For the classical merge mode, the partitioning and their related texture residual (if needed) and their related motion vector predictors index are transmitted.

For both Merge modes, no motion vector residual is transmitted. To derive the motion vector predictors, the Merge modes take into account the value of the reference frame index, the direction (Bi directional or uni-directional) and the list (with the uni-directional direction) of the motion vector predictors. The Merge mode uses a motion vector predictor and its reference frame index, unless the predictor is a temporal predictor where these parameters are derived from spatial predictors.

For the Merge modes, 5 predictors are considered: in this specific order: "Left", "Above", "Temporal", "Above Right", "Below Left". The embodiment of the invention is applied as the Inter mode.

Signalling of the index of the selected motion vector predictor depends on the result of the constructed motion vector predictor set described above with reference to FIG. 10 or 11. Indeed, the amount of bits allocated to the signalling depends on the number of motion vectors remaining in the constructed set. For instance, if at the end of this algorithm, only one motion vector remains, no overhead is required to signal the motion vector predictor index, since the index can easily be retrieved by the decoder. Table 1 gives the codeword for each index coding according to the number of predictors after the suppression process.

TABLE 1

| | Codeword when the amount of predictors in the set is N | | | | |
|---|---|---|---|---|---|
| Index | N = 1 | N = 2 | N = 3 | N = 4 | N = 5 |
| 0 | (inferred) | 0 | 0 | 0 | 0 |
| 1 | | 1 | 10 | 10 | 10 |
| 2 | | | 11 | 110 | 110 |
| 3 | | | | 111 | 1110 |
| 4 | | | | | 1111 |

Although the present invention has been described hereinabove with reference to specific embodiments, the present invention is not limited to the specific embodiments, and modifications will be apparent to a skilled person in the art which lie within the scope of the present invention. Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of decoding a bitstream comprising an encoded sequence of images, at least one portion of an image having been encoded by an encoder using motion compensation with respect to a reference image portion, the method comprising for at least one image portion to be decoded:

obtaining from the bitstream an index i of a motion information predictor previously selected by the encoder for encoding said image portion, the motion information predictor has been selected among a first list of N motion information predictors indexed from 0 to N−1, the first list has been constructed by the encoder using a process of derivation of motion information predictors;

constructing a second list of (i+1) motion information predictors indexed from 0 to i, wherein (i+1)<N, by deriving only first (i+1) non-duplicate motion information predictors using the same process of derivation of motion information as the encoder, thereby stopping the deriving after the $(i+1)^{th}$ non-duplicate motion information predictor is derived; and retrieving, for decoding of the image portion, the motion information predictor last indexed from the constructed second list of motion information predictors.

2. A method according to claim 1 wherein the step of constructing the second list is performed by iteratively deriving (i+1) motion information predictors, and wherein deriving each motion information predictor j, $0 \leq j \leq (i+1)$, comprises:

deriving a motion information predictor j;

comparing the derived motion information predictor to any previously derived motion information predictor, 0 to j−1;

wherein, in the case where the derived motion information predictor j is different to any of the previously derived motion information predictors 0 to j−1, the derived motion information predictor is added to the second list of motion information predictors, otherwise the derived motion information predictor is replaced with a replacement motion information predictor different to any of the previously derived predictors 0 to j−1.

3. A method according to claim 2 wherein the replacement motion information predictor is derived according to the value of the derived motion information predictor j and data of a motion vector field storing encoded motion vectors of the current image and of previous images of the sequence.

4. A method according to claim 2 further comprising the step of comparing the replacement motion information predictor with each of the previously derived motion information predictors 0 to j−1, of the second list of motion information predictors and in the case where the replacement motion information predictor is not different to each of the previously derived motion information predictors 0 to j−1, the method further comprising deriving another replacement motion information predictor.

5. A method according to claim 1 comprising a step of determining a number of motion information predictors in the first list of motion information predictors and retrieving an information item to obtain the index i of the previously selected motion information predictor based on the number of motion information predictors in the first list of motion information predictors.

6. A computer program product for a programmable apparatus stored on a non-transitory computer-readable medium, the computer program product comprising a sequence of instructions for implementing a method according to claim 1 when loaded into and executed by the programmable apparatus.

7. A non-transitory computer-readable storage medium storing instructions of a computer program for implementing a method, according to claim 1.

8. A decoding device for decoding a bitstream comprising an encoded sequence of images, at least one portion of an image having been encoded by an encoder using motion compensation with respect to a reference image portion, the decoding device comprising a microprocessor configured for carrying out steps of:

obtaining from the bitstream, an index i of a motion information predictor previously selected by the encoder for encoding said image portion, the motion information predictor has been selected among a first list of N motion information predictors indexed from 0 to N−1, the first list has been constructed by the encoder using a process of derivation of motion information predictors constructing a second list of (i+1) motion information predictors indexed from 0 to i, wherein (i+1)<N, by deriving only first (i+1) non-duplicate motion information predictors using the same process of derivation of motion information as the encoder, thereby stopping the deriving after the $(i+1)^{th}$ non-duplicate motion information predictor is derived; and retrieving, for decoding of the image portion, the motion information predictor last indexed from the constructed second list of motion information predictors.

9. A device according to claim 8 wherein the microprocessor is configured for, when constructing the second list by iteratively deriving (i+1) motion information predictors, and when deriving each motion information predictor j, $0 \leq j \leq (i+1)$, carrying out steps of:

deriving a motion information predictor j, comparing the derived motion information predictor to any previously derived motion information predictor, 0 to j−1;

wherein in the case where the derived motion information predictor j is different to any of the previously derived motion information predictors 0 to j−1, the microprocessor is configured to add the derived motion information predictor to the second list of motion information predictors, otherwise the derived motion information predictor is replaced with a replacement motion information predictor different to any of the previously derived predictors 0 to j−1.

10. A device according to claim 9 wherein the microprocessor is configured to derive the replacement motion information predictor according to the value of the derived motion information predictor j and data of a motion vector field storing encoded motion vectors of the current image and of previous images of the sequence.

11. A device according to claim 9 wherein the microprocessor is configured to compare the replacement motion information predictor with each of the previously derived motion information predictors 0 to j−1, of the second list of motion information predictors and in the case where the replacement motion information predictor is not different to each of the previously derived motion information predictors 0 to j−1, the microprocessor is configured to derive another replacement motion information predictor.

12. A device according to claim 8 wherein the microprocessor is configured to determine a number of motion information predictors in the first list of motion information predictors and to retrieve an information item to obtain the index i of the selected motion information predictor based on the number of motion information predictors in the first list of motion information predictors.

13. A method of deriving motion information of an image portion of an image predicted by motion prediction with respect to at least one reference image, the method comprising for said image portion:
    obtaining an index i of a motion information predictor previously selected by an encoder for encoding said image portion, the motion information predictor being selected among a first list of N motion information predictors indexed from 0 to N−1,
    constructing a second list of (i+1) motion information predictors indexed from 0 to i, wherein (i+1)<N, by deriving only first (i+1) non-duplicate motion information predictors using the same process of derivation of motion information as the encoder, thereby stopping the deriving after the (i+1)$^{th}$ non-duplicate motion information predictor is derived; and
    wherein the number N of motion information predictors of the first list of motion information predictors is determined based on data from a current slice and is greater than the number i+1 of motion information predictors of the second list of motion information predictors.

14. A method of decoding a bitstream comprising an encoded sequence of images, at least one portion of an image having been encoded by motion compensation with respect to a reference image portion, the method comprising for at least one image portion to be decoded:
    a step of deriving motion information of the image portion according to the method of claim 13, wherein the first list has been constructed by an encoder using a process of derivation of motion information predictors, the index i being an index of a selected motion information predictor in said first list of motion information predictors derived during a encoding process applied to said image; and
    retrieving, for decoding of the image portion, the motion information predictor last indexed from the constructed second list of motion information predictors.

15. A method of encoding a sequence of images into a bitstream, at least one portion of an image being encoded by motion compensation with respect to a reference image portion, the method comprising for at least one image portion to decode
    a step of deriving motion information of the image portion according to the method of claim 13, wherein the index i is determined based on a threshold parameter; and
    selecting, from among the second list of motion information predictors a motion information predictor indexed by the index i for encoding the image portion; and
    encoding an information item to provide the index i of the last indexed motion information predictor of the constructed second list of motion information predictors.

* * * * *